United States Patent
Scervo et al.

(10) Patent No.: US 10,247,086 B2
(45) Date of Patent: Apr. 2, 2019

(54) COOLANT HEADER TANK

(71) Applicant: McLaren Automotive Limited, Surrey (GB)

(72) Inventors: Emilio Scervo, Surrey (GB); Jeremy Peter Green, Surrey (GB)

(73) Assignee: McLaren Automotive Limited, Surrey (GB)

( * ) Notice: Subject to any disclaimer, the term of this patent is extended or adjusted under 35 U.S.C. 154(b) by 0 days.

(21) Appl. No.: 15/717,750

(22) Filed: Sep. 27, 2017

(65) Prior Publication Data
US 2018/0087442 A1    Mar. 29, 2018

(30) Foreign Application Priority Data
Sep. 28, 2016  (GB) .................................. 1616462.6

(51) Int. Cl.
| F01P 11/02 | (2006.01) |
| B60K 11/04 | (2006.01) |
| F01P 11/04 | (2006.01) |
| F01P 11/10 | (2006.01) |

(52) U.S. Cl.
CPC ............. *F01P 11/029* (2013.01); *B60K 11/04* (2013.01); *F01P 11/028* (2013.01); *F01P 11/04* (2013.01); *F01P 11/10* (2013.01)

(58) Field of Classification Search
CPC .......... F01P 11/029; F01P 11/028; F01P 11/18
See application file for complete search history.

(56) References Cited

U.S. PATENT DOCUMENTS

| 4,473,037 A * | 9/1984 | Michassouridis .... F01P 11/0247 123/41.1 |
| 4,510,893 A * | 4/1985 | Schweiger ........... F01P 11/0247 123/41.02 |
| 5,553,576 A | 9/1996 | Nikly |

(Continued)

FOREIGN PATENT DOCUMENTS

| DE | 102013221447 | 5/2015 |
| EP | 0561673 | 4/1996 |
| EP | 1482586 A1 | 12/2004 |

OTHER PUBLICATIONS

European Search Report for corresponding Appl No. 17193636.2, dated Feb. 26, 2018.

(Continued)

*Primary Examiner* — Long T Tran
(74) *Attorney, Agent, or Firm* — Fish & Richardson P.C.

(57) ABSTRACT

A vehicle comprising: a coolant header tank defining a storage volume for storing a fluid coolant and having a minimum fluid level within the storage volume, the coolant header tank comprising a port connected to the portion of the storage volume that contains fluid when filled to the minimum fluid level; and a temperature regulating system configured to carry the fluid coolant, the temperature regulating circuit comprising a branch connected between an air collecting region of the temperature regulating system and the port of the coolant header tank to permit air to flow from the temperature regulating system to the coolant header tank, the temperature regulating system being configured so that the air collecting region is higher than a horizontal plane that is defined by the minimum fluid level.

20 Claims, 2 Drawing Sheets

(56) References Cited

U.S. PATENT DOCUMENTS

| | | | | |
|---|---|---|---|---|
| 5,836,269 A * | 11/1998 | Schneider | ............... | F01P 11/029 123/41.1 |
| 6,550,431 B1 * | 4/2003 | Holmstrom | ............ | F01P 11/028 123/41.54 |
| 2001/0019789 A1 | 9/2001 | Hirakata | | |
| 2003/0029167 A1 * | 2/2003 | Hudson | ................... | F01P 7/165 60/598 |
| 2006/0113815 A1 | 6/2006 | Ohzono | | |
| 2008/0190385 A1 * | 8/2008 | Bangert | ................. | F01P 11/028 123/41.54 |
| 2009/0277401 A1 * | 11/2009 | Theorell | ................ | F01P 11/028 123/41.1 |
| 2011/0210125 A1 * | 9/2011 | Kardos | .................. | F01P 11/029 220/502 |
| 2015/0308326 A1 * | 10/2015 | Davies | ................... | F01P 11/029 137/2 |
| 2015/0345365 A1 * | 12/2015 | Wikstrom | .............. | F01P 11/029 123/41.44 |
| 2015/0345369 A1 * | 12/2015 | Ramachandran | ...... | F01P 11/029 165/51 |
| 2016/0222869 A1 * | 8/2016 | Nishiguchi | ............ | F01P 11/029 |
| 2017/0191767 A1 * | 7/2017 | Elkenkamp | ............... | F01P 3/00 |
| 2017/0350307 A1 * | 12/2017 | Kerkewitz | ............. | F01P 11/029 |

OTHER PUBLICATIONS

Search report Under Section 17 issued in GB1616462.6 dated Mar. 17, 2016 (3 pages).

\* cited by examiner

COOLANT HEADER TANK

CROSS-REFERENCE TO RELATED APPLICATIONS

This application claims priority to Great Britain Application Serial No. GB 1616462.6, filed on Sep. 28, 2016.

This invention relates to a vehicle comprising a coolant header tank and a temperature regulating system.

It is desirable when designing a road vehicle to have as much freedom regarding the exterior shape and design of the road vehicle as possible. This is so that individual character can be given to a particular vehicle model and also to have the ability to design particular aerodynamic performance from the vehicle exterior. However, the exterior shape and style of a vehicle can be limited by a number of factors that are generally present in most vehicles of a particular type and class. Some of these factors may directly influence the exterior appearance of the vehicle. For instance, a road car may typically comprise four wheels. It may also typically comprise a passenger compartment which is sized to accommodate at least two full size adult human beings. Other factors may indirectly influence the exterior appearance of the vehicle. For instance, the road car may comprise an engine which generally puts a limit on the lower size of the engine bay. This lower limit affects the exterior shape and design of the road vehicle.

Areas of the vehicle where it is desirable to have as much design freedom as possible are the front and rear portions of the vehicle either end of the passenger compartment. It is desirable in these areas to have the freedom to select particular heights and shapes of the vehicle body to provide desirable aerodynamic characteristics. For instance, by making the upper surface of the vehicle body lower to the ground to improve the streamlining of the vehicle. This is particularly true on high-performance vehicles where aerodynamic performance is especially important. It is also important for such vehicles to also possess aesthetics that distinguish the vehicle from lower cost, more conventional vehicles. Again, a lower body height either side of the passenger compartment can assist in achieving this.

A typical vehicle comprises a temperature regulating system to control the temperature of vehicle components. This is because during use a vehicle can generate thermal energy. For instance, from burning fuel in an engine, running electric motors at high speeds, and/or compressing air for use in an engine. The temperature regulating system may channel coolant fluid between vehicle components and heat exchangers to remove excess heat from the vehicle components. A coolant header tank is usually provided with such a system to provide a head of coolant fluid for the temperature regulating system and provide room for expansion/contraction of the coolant fluid during operation of the vehicle. The coolant header tank is generally positioned at the highest point of fluid within the temperature regulating system. This is so that any air in the system can bleed into the header tank where it cannot disrupt the operation of the temperature regulating system, for instance by causing an air lock. Also, it assists in coolant fluid being drawn back in to the temperature regulating system when the coolant fluid cools.

As vehicle components that need cooling, such as an engine, and heat exchangers that provide cooling have particular height and/or location constraints a typical header tank is thus one vehicle component that is a factor in determining the lowest height of the upper body panels of a vehicle.

It would therefore be desirable for there to be an improved header tank which can be positioned lower relative to the height of the temperature regulating system.

According to a first aspect of the present invention there is provided a vehicle comprising: a coolant header tank defining a storage volume for storing a fluid coolant and having a minimum fluid level within the storage volume, the coolant header tank comprising a port connected to the portion of the storage volume that contains fluid when filled to the minimum fluid level; and a temperature regulating system configured to carry the fluid coolant, the temperature regulating circuit comprising a branch connected between an air collecting region of the temperature regulating system and the port of the coolant header tank to permit air to flow from the temperature regulating system to the coolant header tank, the temperature regulating system being configured so that the air collecting region is higher than a horizontal plane that is defined by the minimum fluid level.

The branch may be connected between a plurality of air collecting regions of the temperature regulating system and the port of the coolant header tank. The temperature regulating system may comprise a first heat exchanger for cooling the coolant, wherein the air collecting region may be located within the heat exchanger and the branch may be connected between the first heat exchanger and the port of the coolant header tank. The temperature regulating system may comprise a cooling circuit configured to carry the fluid coolant, and the first heat exchanger may comprise at least one port connected to the coolant circuit to permit fluid flow from the first heat exchanger to the cooling circuit and at least one port connected to the coolant circuit to permit fluid flow to the first heat exchanger.

The temperature regulating system may comprise a second heat exchanger for cooling the coolant, wherein a first air collecting region may be located within the first heat exchanger, a second air collecting region may be located within the second heat exchanger, and the branch may be connected between the first heat exchanger, second heat exchanger and the port of the coolant header tank. The temperature regulating system may comprise a cooling circuit configured to carry the fluid coolant, and the second heat exchanger may comprise at least one port connected to the coolant circuit to permit fluid flow from the second heat exchanger to the cooling circuit and at least one port connected to the coolant circuit to permit fluid flow to the second heat exchanger.

The coolant header tank may have a maximum fluid level and the air collecting region(s) may be located higher than the maximum fluid level. The temperature regulating system may be configured so that at least one of the air collecting region(s) are located at the highest point for fluid within the temperature regulating system.

The vehicle may comprise a powertrain, the coolant header tank may comprise a second port connected to a portion of the storage volume that contains fluid when filled to the minimum fluid level, and the temperature regulating circuit may comprise a second branch connected between an air collecting region that is located within the powertrain and the second port to permit air to flow from the temperature regulating system to the coolant header tank. The air collecting region located within the powertrain may be located higher than the horizontal plane that is defined by the minimum fluid level. The second branch may comprise a fluid restriction between the connection to the second port and the connection to the air collecting region located within the powertrain. The powertrain may comprise a cylinder head and the air collecting region located within the powertrain may be located within the cylinder head.

The branches may permit coolant fluid to flow between the temperature regulating system and the coolant header tank. The coolant header tank may comprise a filler opening with a lip positioned higher than the air collecting region(s). The lip may be positioned higher than the highest point for fluid within the temperature regulating system.

The temperature regulating system may comprise a cooling circuit configured to carry the fluid coolant, the coolant header tank may comprise a third port connected to the portion of the storage volume that contains fluid when filled to the minimum fluid level, and the temperature regulating circuit comprising a coolant feed branch connected between the third port and the cooling circuit to permit fluid to flow between the coolant header tank and the cooling circuit. The third port may be connected to the coolant header tank so that the third port is the positioned lowest within the coolant header tank.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle that comprises a coolant header tank and a temperature regulating system. The coolant header tank defines a storage volume for storing a fluid coolant. The coolant header tank has a defined minimum fluid level within the storage volume. The coolant header tank comprises a port connected to the portion of the storage volume that contains fluid when filled to the minimum fluid level. The port may be connected lower than the minimum fluid level of the coolant header tank. The temperature regulating system is configured to carry the fluid coolant. The temperature regulating circuit comprises a branch connected between an air collecting region of the temperature regulating system and the port of the coolant header tank to permit air to flow from the temperature regulating system to the coolant header tank. The temperature regulating system is configured so that the air collecting region is higher than a horizontal plane that is defined by the minimum fluid level. The air collecting region may be higher than the minimum fluid level of the coolant header tank. Higher and lower may be defined in relation to the normal attitude of the vehicle. The normal attitude of the vehicle may be defined as the attitude the vehicle has when resting on a horizontal surface.

Figure 1:
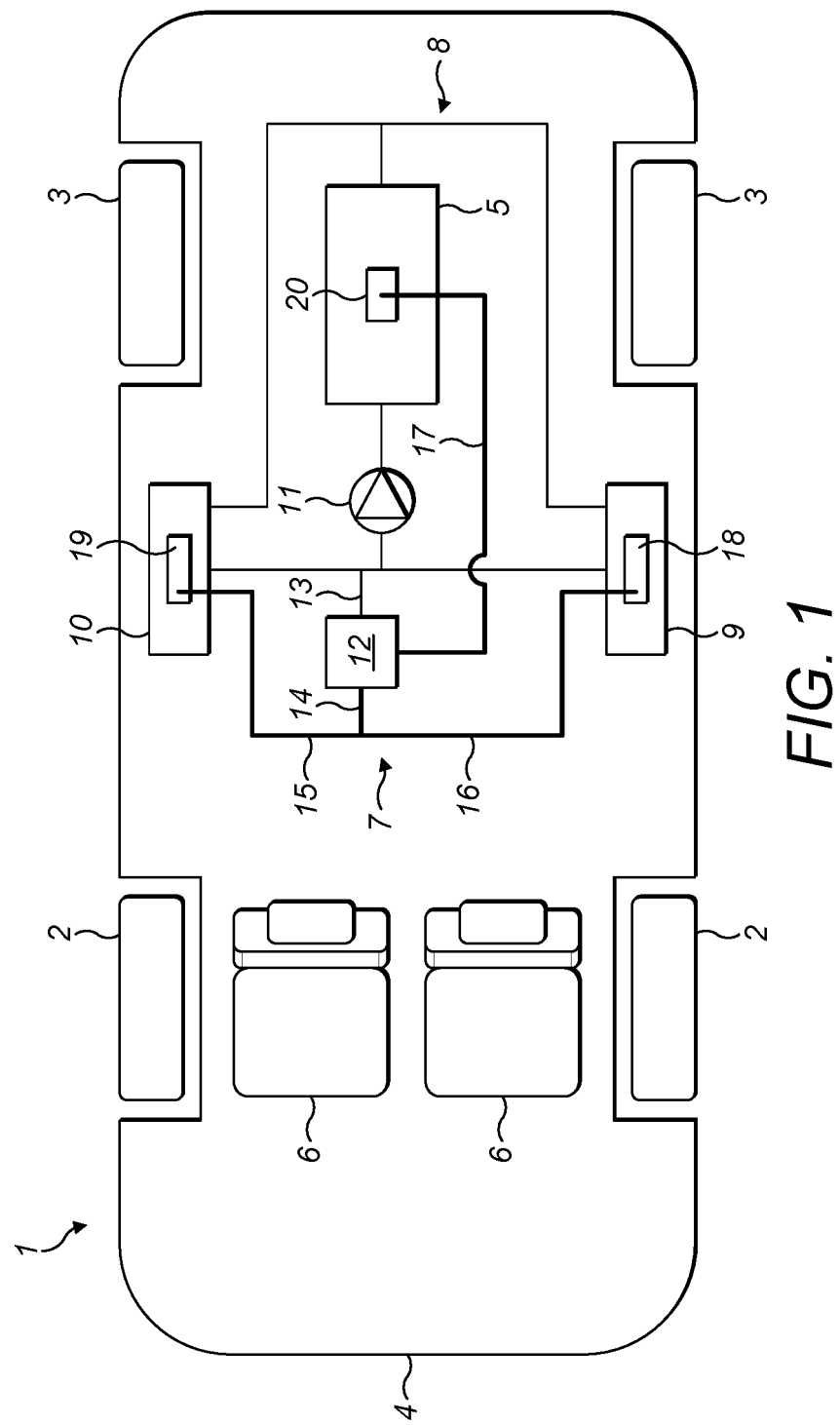
FIG. 1 shows a schematic illustration of a vehicle comprising a coolant header tank and temperature regulating system.

FIG. 1 shows a vehicle 1. Vehicle 1 comprises a plurality of wheels 2, 3 for supporting the vehicle body 4 on a surface. Some of those wheels 2 may be located towards the front of the vehicle and some of those wheels 3 may be located towards the rear of the vehicle. The vehicle 1 comprises a powertrain 5. The powertrain 5 may comprise any configuration of drive units such as an internal combustion engine, one or more electrical machines and/or another device that is capable of providing motive power to the drive wheels of the vehicle. At least some of the wheels may be coupled to the powertrain 5 to receive motive power from the powertrain 5 and thus may be drive wheels of the vehicle. The vehicle 1 may be a car. The vehicle may be a road car.

The drive units of powertrain 5 may be located at the rear, middle and/or front of the vehicle. For example, one or more wheels may be driven by electric motors located near to those respective wheels whilst other wheels may be driven by an internal combustion engine located towards the rear of the vehicle. As pictured in FIG. 1, the powertrain 5 may be located in the middle or towards the rear of the vehicle. The powertrain 5 may be located between the front and rear axles of the wheels 2, 3. Within the vehicle body is at least one seat 6 for passengers of the vehicle 1. At least one of those passengers may be a driver of the vehicle 1.

The vehicle 1 comprises a temperature regulating system 7. The temperature regulating system is configured to carry a fluid coolant. The coolant could be a liquid such as water or oil. The temperature regulating system 7 comprises a cooling circuit 8 around which the fluid coolant circulates so as to convey heat generated by vehicle components served by the cooling circuit to at least one heat exchanger 9, 10. As shown in FIG. 1, the vehicle may comprise a first heat exchanger 9 and a second heat exchanger 10. The heat exchanger would typically be an air cooled radiator arranged to dump heat in the coolant into the environment, but more generally could be any kind of heat exchanger for transferring heat energy from the coolant to the environment or a second system.

The heat exchangers 9, 10 may be located anywhere within the body of the vehicle. However, it is advantageous if they are located in a position that enables air flow to be channeled through them. For instance, they may be located at the front of the vehicle to enable air flow that contacts the front surfaces of the vehicle body generated by the motion of the vehicle 1 to be channeled through them. They may be located at the sides of the vehicle to enable air flow that moves past the sides of the vehicle body to be channeled through them. They may be located at the rear of the vehicle to enable air flow that passes the rear quarter of the vehicle to be channeled through them. Heat exchangers located at the side and rear of the vehicle 1 are particularly useful in mid- and rear-engine vehicles.

The temperature regulating system 7 may also comprise at least one fluid pump 11. Coolant can be pumped around the cooling circuit 8 by at least one coolant pump 11. The coolant pump 11 may be positioned in the cooling circuit 8 so that the flow from the coolant pump 11 is presented to the warmest vehicle components first. This enables these components to benefit from the highest flow of coolant fluid. For instance, in FIG. 1, the powertrain 5 is pictured as receiving the coolant fluid after it has been through coolant pump 11. Although only powertrain 5 is illustrated in FIG. 1 as being part of cooling circuit 8 it will be appreciated that many other vehicle components may be cooled by cooling circuit 8. Additionally, vehicle 1 may comprise more than one cooling circuit 8, for instance, vehicle 1 may comprise a high temperature cooling circuit and a low temperature cooling circuit.

The high temperature cooling circuit may be coupled to those vehicle components that generate or require a high level of thermal energy, such as the powertrain 5, transmission via a transmission oil cooler, air intake compressors that compress the intake air using exhaust gases (i.e. one or more turbochargers), and/or a passenger compartment heater. The low temperature cooling circuit may be coupled to those vehicle components that generate or require a lower level of thermal energy, such as the air intake coolers, and/or the clutch via a clutch oil cooler. Each of these cooling circuits may be coupled to separate heat exchangers 9, 10 for transferring heat energy from the coolant to the environment or a second system.

The vehicle 1 also comprises a coolant header tank 12. The coolant header tank 12 defines a storage volume for storing the fluid coolant of the temperature regulating system 7. The coolant header tank 12 functions as a reservoir to hold a quantity of the fluid coolant and provide a location that air in the temperature regulating system 7 can flow to so as to avoid air causing problems in the flow of coolant fluid around the coolant channels 8 of the temperature regulating system 7. In normal use, the storage volume of the coolant header tank 12 is partially filled with coolant fluid and partially filled with gas, such as air. The presence of gas in the storage volume permits for the expansion of the coolant fluid due to thermal expansion without putting undue pressure on the components of the temperature regulating system 7. This is because the gas is more readily compressible than the coolant fluid.

As shown in FIG. 1, coolant header tank 12 may be connected to the coolant circuit(s) 8 of the temperature regulating system 7 by a coolant feed branch 13 of the coolant circuit(s) 8. This coolant feed branch 13 may be known as a suction line of the coolant circuit(s) 8. The purpose of the coolant feed branch 13 is to provide the main route of fluid flow between the coolant header tank and the coolant circuit(s) 8 of the temperature regulating system 7. The coolant header tank 12 may also be connected to air collecting regions 18, 19, 20 of the temperature regulating system 7 by one or more bleed branches 14, 17. The bleed branches, as shown by bleed branch 14, may comprise one or more sub-branches 15, 16 which connect to different air collecting regions 18-20 of the temperature regulating system 7. The air collecting regions 18-20 of the temperature regulating system 7 are the portions of the temperature regulating system 7 where air naturally accumulates in the fluid channels of the temperature regulating system 7. These air collecting regions 18-20 may be located in part of the coolant circuit(s) 8. Alternatively, these air collecting regions may be located in part of the heat exchangers 9, 10 as shown in FIG. 1 by air collecting regions 18, 19 and/or in other vehicle components that are connected to temperature regulating circuit 7 such as the powertrain 5 as shown in FIG. 1 by air collecting region 20.

As shown in FIG. 1, air collecting region 18 is connected by sub-branch 16 that forms part of bleed branch 14 which is connected to coolant header tank 12, air collecting region 19 is connected by sub-branch 15 that forms part of bleed branch 14 which is connected to coolant header tank 12, and air collecting region 20 is connected to coolant header tank 12 by bleed branch 17.

Figure 2:
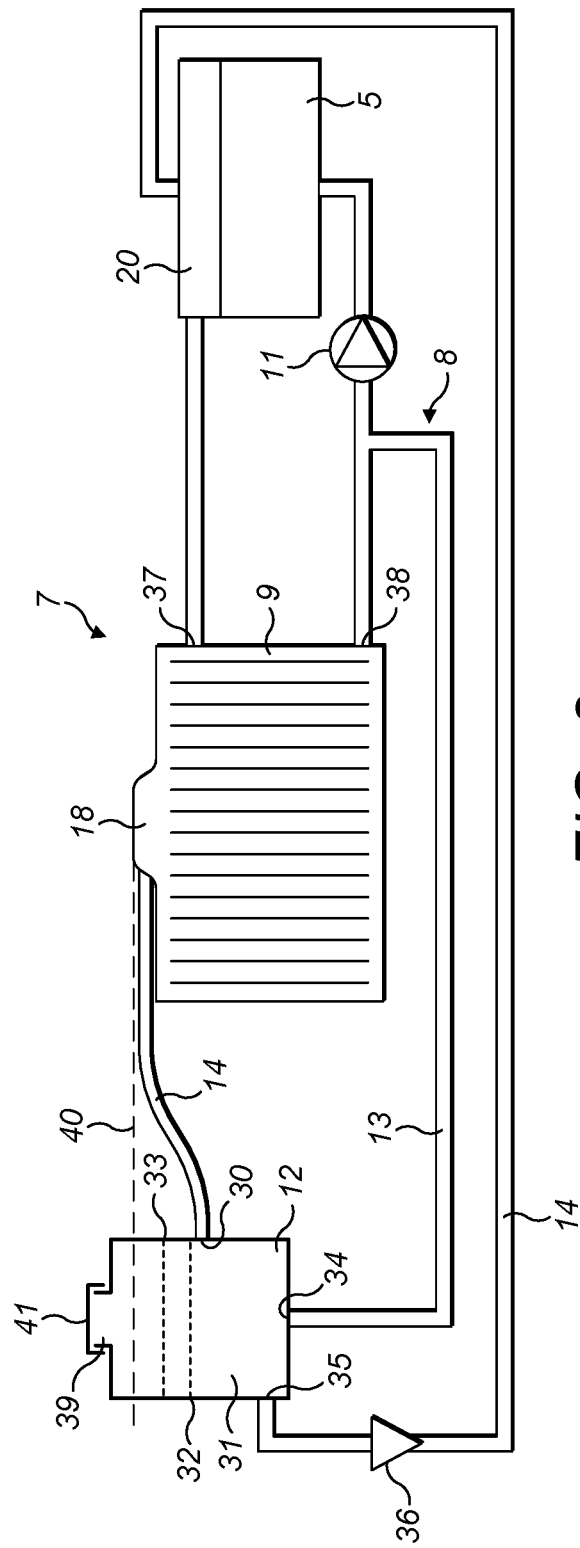
FIG. 2 shows a schematic view of vehicle components illustrating the relative height of particular vehicle components.

FIG. 2 shows a schematic view of vehicle components illustrating the height of particular vehicle components relative to parts of the temperature regulating system 7 and the coolant header tank 12. The location of the coolant header tank 12 is a particular design constraint in the ability to have a vehicle body 4 that has a low front and/or rear portion. It has been identified that the coolant header tank 12 can be positioned in the vehicle so that the coolant header tank 12 has a minimum fluid level at a level lower than the highest point of the temperature regulating system 12. This is in contrast to the standard position of the coolant header tank 12 as the highest point in the system because conventional wisdom is that the coolant header tank needs to be the highest point in the system so that any gas that is present in the temperature regulating system 7 flows to that highest point, due to having a lower density, and is thus collected in the coolant header tank 12. A certain configuration of the positions of the coolant header tank 12 and the connections between the coolant header tank 12 and the temperature regulating system 7 are required to enable the coolant header tank 12 to be positioned lower within the vehicle body 4.

The coolant header tank 12 may comprise a first port 30 that is connected to the storage volume 31. The coolant header tank 12 has a defined minimum fluid level 32 as shown in FIG. 2 by dotted-line 32. This is the minimum fluid level to which the coolant header tank 12 should be filled with coolant fluid during normal operation of the vehicle 1. This minimum fluid level 32 means that there is the minimum correct ratio of coolant fluid to gas present in the coolant header tank 12 to account for thermal expansion in the coolant fluid. The coolant header tank 12 may also have a defined maximum fluid level 33 as shown in FIG. 2 by dotted-line 33. This is the maximum fluid level 33 to which coolant header tank 12 should be filled with coolant fluid during normal operation of the vehicle 1. This maximum fluid level 33 means that there is the maximum correct ratio of coolant fluid to gas present in the coolant header tank 12 to account for thermal expansion in the coolant fluid. The minimum fluid level 32 and/or the maximum fluid level 33 may be the levels of coolant fluid that should be present in the coolant header tank 12 when the coolant fluid is at ambient temperature. I.e. whilst the coolant fluid is not providing cooling to any vehicle components and thus not storing thermal energy generated by those vehicle components. The minimum fluid level 32 defines a first horizontal plane. This is the horizontal plane that would be defined by the surface of the coolant fluid if filled to the minimum fluid level 32 and the surface of the coolant fluid was not subject to any disturbances, such as vibrations. The maximum fluid level 33 defines a second horizontal plane. This is the horizontal plane that would be defined by the surface of the coolant fluid if filled to the maximum fluid level 33 and the surface of the coolant fluid was not subject to any disturbances, such as vibrations.

The first port 30 is connected to the portion of the storage volume 31 that contains coolant fluid when the storage volume 31 is filled to the minimum fluid level 32. In this way, the first port 30 is positioned on the coolant header tank 12 below the minimum fluid level within the storage volume relative to the normal attitude of the vehicle. The first port 30 may be connected to the top portion of the storage volume 32 that contains coolant fluid when the storage volume 31 is filled to the minimum fluid level 32. I.e. the port is connected close to but below the minimum fluid level 32. The temperature regulating circuit comprises a bleed branch 14 that is connected between the first port 30 and an air collecting region 18 of the temperature regulating circuit. The bleed branch 14 permits air to flow from the air collecting region 18 to the coolant header tank 12. Under normal operation, the bleed branch 14 will also be filled with coolant fluid and so coolant fluid may also flow between the air collecting region 18 and the coolant header tank 12. The first port 30, to which the bleed branch 14 is connected, may be the highest port for fluid flow within the coolant header tank 12. The first port 30, to which the bleed branch 14 is connected, may be the highest port for fluid flow that is below the minimum fluid level 32.

The air collecting region 18 that is connected to first port 30 is higher than the first horizontal plane defined by the minimum fluid level of the coolant header tank. This is as shown by dashed-line 40 in FIG. 2. It has been discovered that due to the pressures present in the temperature regulating system 7 under operating conditions any air that has collected in air collecting region 18 will be forced from this region along bleed line 14 to coolant header tank 12. This is even though the flow path from the air collecting region 18 to coolant header tank 12 is in a generally downwards direction relative to the normal attitude of the vehicle 1. Therefore, as long as the port 30 that the bleed line 14 connects to is covered by fluid at all times, as is expected to be the case if it is located below the minimum fluid level of the coolant header tank, then air will bleed from the air collecting region 18 to the coolant header tank 12.

The air collecting region 18 that is connected to first port 30 may also be higher than the second horizontal plane defined by the maximum fluid level of the coolant header tank. This advantageously allows the coolant header tank 12 to be positioned even lower within the vehicle body 4. The air collecting region 18 may be one of the highest points within the temperature regulating system 7. The air collecting region 18 may be the highest point within the temperature regulating system 7. In either case, the air collecting regions 18 are natural regions for gas in the temperature regulating system 7 to pool.

As shown in FIG. 2, the air collecting region 18 may be located within a first heat exchanger 9. In this case, the bleed branch 14 may be connected between the first heat exchanger 9 and the first port 30 of the coolant header tank. The heat exchangers are usually placed at a level within the vehicle body such that the top regions of the heat exchangers are the highest points within the temperature regulating system 7. As shown in FIG. 1 and described herein, the vehicle 1 may comprise more than one heat exchanger 9, 10 each with a bleed branch connected to air collecting regions associated with respective heat exchangers.

The coolant header tank 12 may comprise other ports connected to the portion of the storage volume 31 that contains fluid when the storage volume 31 is filled to the minimum fluid level 32. For example, the coolant header tank 12 may comprise a third port 34 that is connected to coolant feed branch 13. The coolant feed branch 13 may be connected to the main coolant circuit 8. The coolant feed branch may not be connected to an air collecting region. This is because it is a supply line for fluid to the coolant circuit 8 and so is connected to a part of the main coolant circuit 8 where fluid is drawn into the coolant circuit 8 rather than a part where there is a stagnation in the fluid flow and hence a part where air can collect. The third port 34 may be located in the bottom surface of the coolant header tank 12. The third port 34 may be the lowest port for fluid flow within the storage volume 31.

The coolant header tank 12 may comprise a second port 35 that is connected to another bleed branch. The another bleed branch may be bleed branch 17 that is connected to air collecting region 20. Air collecting region 20 may be located within powertrain 5. Air collecting region 20 may permit air to flow from the cylinder head of the powertrain 5 to the coolant header tank 12. Bleed branch 17 may comprise a restriction 36 to limit the flow of fluid and/or air through bleed branch 17 between coolant header tank 12 and the air collecting region 20. The restriction 36 may be formed by a reduction in the cross-sectional area of the tube through which coolant fluid flows. The restriction 36 reduces the flow of fluid through the coolant header tank 12. This is because it provides resistance to the flow of fluid along that route thus meaning more fluid flows preferentially around the cooling circuit 8 which is desirable.

As shown in FIG. 2, each heat exchanger 9 may comprise connections to one or more cooling circuits 8 of the temperature regulating system. Each heat exchanger 9 may comprise one or more ports 37 that are connected to the cooling circuit 8 to receive coolant fluid flow from those ports. Each heat exchanger 9 may comprise one or more ports 38 that are connected to the cooling circuit 8 to provide coolant fluid flow to those ports. The coolant fluid flow may be generated by the coolant pump 11. These ports 37, 38 that provide coolant fluid flow to and from the cooling circuit 8 may be different to the connection from air collecting region 18 to coolant header tank 12.

The coolant header tank 12 may comprise a filler opening 39 to permit entry of fluid into the coolant header tank 12. The filler opening 39 may permit coolant fluid to be poured into the coolant header tank 12. The filler opening 39 may comprise a lip which defines the coolant fluid level at which the storage volume can accept no more coolant fluid whilst the fluid filler cap 41 is removed. There may be a portion of the space inside the coolant header tank 12 above that level, but as fluid would spill out of the filler opening 39 fluid cannot be stored there whilst the fluid filler cap 41 is removed. The fluid filler cap 41 may sealingly engage with the filler opening 39 to prevent fluid from flowing through the filler opening 39. The lip of the filler opening 39 may be positioned higher than the horizontal plane defined by the highest of the air collecting regions. The lip of the filler opening 39 may be positioned higher than the horizontal plane defined by the highest point of fluid in the temperature regulation system 7.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
   a coolant header tank defining a storage volume for storing a fluid coolant and having a minimum fluid level within the storage volume, the coolant header tank comprising a first port connected to the portion of the storage volume that contains fluid when filled to the minimum fluid level and a third port connected to the portion of the storage volume that contains fluid when filled to the minimum fluid level; and
   a temperature regulating system configured to carry the fluid coolant, the temperature regulating circuit comprising:
   a cooling circuit configured to carry the fluid coolant;
   a branch connected between an air collecting region of the temperature regulating system and the first port of the coolant header tank to permit air to flow from the temperature regulating system to the coolant header tank, the temperature regulating system being configured so that the air collecting region is higher than a horizontal plane that is defined by the minimum fluid level; and a coolant feed branch connected between the third port and the cooling circuit to permit fluid to flow between the coolant header tank and the cooling circuit.

2. The vehicle according to claim 1, wherein the branch is connected between a plurality of air collecting regions of the temperature regulating system and the first port of the coolant header tank.

3. The vehicle according to claim 1, the temperature regulating system comprising a first heat exchanger for cooling the coolant, wherein the air collecting region is located within the heat exchanger and the branch is connected between the first heat exchanger and the first port of the coolant header tank.

4. The vehicle according to claim 3, the first heat exchanger comprising at least one port connected to the coolant circuit to permit fluid flow from the first heat exchanger to the cooling circuit and at least one port connected to the coolant circuit to permit fluid flow to the first heat exchanger.

5. The vehicle according to claim 3, the temperature regulating system comprising a second heat exchanger for cooling the coolant, wherein a first air collecting region is located within the first heat exchanger, a second air collecting region is located within the second heat exchanger, and the branch is connected between the first heat exchanger, second heat exchanger and the port of the coolant header tank.

6. The vehicle according to claim 5, the second heat exchanger comprising at least one port connected to the coolant circuit to permit fluid flow from the second heat exchanger to the cooling circuit and at least one port connected to the coolant circuit to permit fluid flow to the second heat exchanger.

7. The vehicle according to claim 5, wherein the coolant header tank has a maximum fluid level and the air collecting regions are located higher than the maximum fluid level.

8. The vehicle according to claim 1, wherein the coolant header tank has a maximum fluid level and the air collecting region is located higher than the maximum fluid level.

9. The vehicle according to claim 1, wherein the temperature regulating system is configured so that at least one of the air collecting region are is located at the highest point for fluid within the temperature regulating system.

10. The vehicle according to claim 1, the vehicle comprising a powertrain, the coolant header tank comprising a second port connected to a portion of the storage volume that contains fluid when filled to the minimum fluid level, and the temperature regulating circuit comprising a second branch connected between an air collecting region that is located within the powertrain and the second port to permit air to flow from the temperature regulating system to the coolant header tank.

11. The vehicle according to claim 10, wherein the air collecting region located within the powertrain is located higher than the horizontal plane that is defined by the minimum fluid level.

12. The vehicle according to claim 10, wherein the second branch comprises a fluid restriction between the connection to the second port and the connection to the air collecting region located within the powertrain.

13. The vehicle according to claim 10, the powertrain comprising a cylinder head and the air collecting region located within the powertrain is located within the cylinder head.

14. The vehicle according to claim 10, wherein the branches permit coolant fluid to flow between the temperature regulating system and the coolant header tank.

15. The vehicle according to claim 10, wherein the coolant header tank has a maximum fluid level and the air collecting regions are located higher than the maximum fluid level.

16. The vehicle according to claim 1, wherein the branches permits coolant fluid to flow between the temperature regulating system and the coolant header tank.

17. The vehicle according to claim 1, wherein the coolant header tank comprises a filler opening with a lip positioned higher than the air collecting region(s).

18. The vehicle according to claim 17, wherein the lip is positioned higher than the highest point for fluid within the temperature regulating system.

19. The vehicle according to claim 1, wherein the third port is connected to the coolant header tank so that the third port is the positioned lowest within the coolant header tank.

20. The vehicle according to claim 1, wherein the temperature regulating system is configured so that the air collecting region is located at the highest point for fluid within the temperature regulating system.

* * * * *

UNITED STATES PATENT AND TRADEMARK OFFICE
CERTIFICATE OF CORRECTION

PATENT NO. : 10,247,086 B2
APPLICATION NO. : 15/717750
DATED : April 2, 2019
INVENTOR(S) : Emilio Scervo and Jeremy Peter Green It is certified that error appears in the above-identified patent and that said Letters Patent is hereby corrected as shown below:

In the Claims

Column 9, Lines 44-45, Claim 9, after "that" delete "at least one of".

Column 9, Line 45, Claim 9, after "region" delete "are".

Column 10, Line 31 (Approx.), Claim 16, delete "branches" and insert -- branch --, therefor.

Signed and Sealed this
Fifth Day of May, 2020

Andrei Iancu
*Director of the United States Patent and Trademark Office*